United States Patent [19]

Darcie et al.

[11] Patent Number: 5,790,287
[45] Date of Patent: Aug. 4, 1998

[54] OPTICAL COMMUNICATION SYSTEM WITH IMPROVED MAINTENANCE CAPABILITIES

[75] Inventors: Thomas Edward Darcie, Middletown; Nicholas J. Frigo, Atlantic Highlands; Peter D. Magill, Freehold, all of N.J.

[73] Assignee: Lucent Technologies, Inc., Murray Hill, N.J.

[21] Appl. No.: 740,083

[22] Filed: Oct. 24, 1996

Related U.S. Application Data

[63] Continuation of Ser. No. 439,059, May 8, 1995, abandoned, which is a continuation-in-part of Ser. No. 333,926, Nov. 3, 1994, Pat. No. 5,559,624, which is a continuation of Ser. No. 29,724, Mar. 11, 1993, abandoned.

[51] Int. Cl.[6] .................. H04B 10/08; H04M 3/00; H04H 1/00; H04N 7/10
[52] U.S. Cl. .................. 359/110; 359/118; 359/125; 359/137; 359/164; 359/167; 379/257; 455/3.1; 455/5.1; 348/12
[58] Field of Search .................. 359/110, 118, 359/119, 125, 137, 164, 167; 379/34, 257, 333; 375/220, 222, 224, 228, 377; 455/3.1, 5.1, 2; 348/7, 12; 370/14, 16, 16.1, 60, 110.1

[56] References Cited

U.S. PATENT DOCUMENTS

| | | | |
|---|---|---|---|
| 4,393,493 | 7/1983 | Edwards | 370/228 |
| 4,430,530 | 2/1984 | Kandell et al. | 379/6 |
| 4,442,320 | 4/1984 | James et al. | 379/42 |
| 4,694,452 | 9/1987 | Beckinger et al. | 370/360 |
| 4,763,317 | 8/1988 | Lehman et al. | 370/358 |
| 4,831,616 | 5/1989 | Huber | 359/137 |
| 4,850,045 | 7/1989 | Funke | 359/110 |
| 5,153,764 | 10/1992 | Faulkner et al. | 359/136 |
| 5,182,744 | 1/1993 | Askew et al. | 370/16 |
| 5,185,738 | 2/1993 | Kelly | 370/95.1 |
| 5,189,673 | 2/1993 | Burton et al. | 370/110.1 |
| 5,202,780 | 4/1993 | Fussgänger | 359/125 |
| 5,285,305 | 2/1994 | Cohen et al. | 359/110 |
| 5,301,050 | 4/1994 | Czerwiel et al. | 359/110 |
| 5,357,360 | 10/1994 | Imhoff et al. | 359/125 |
| 5,442,472 | 8/1995 | Skrobko | 359/110 |

*Primary Examiner*—Hezron E. Williams
*Assistant Examiner*—Richard A. Moller

[57] ABSTRACT

A communication system where a central module repetitively sends interrogation optical pulses to endpoint modules in order to determine operational state of the endpoint modules and of the two-way communication path to the central module. Those pulses also determine whether the endpoint module wishes to initiate communication with the central office. In the endpoint module, a modulator whose function is to send data from the customer's terminal is arranged to operate in two distinct modes. When it is "powered off", which is when the customer terminal is inactive, it allows central office signals to loop-back to the central office. In this state, the optical pulses sent by the central office serve the function of optical continuity checking. When an endpoint module wishes to establish a connection, i.e., the customer terminal wishes to "make a call", the modulator is arranged to interpose itself in the loop-back path and inform the central module of its desire, such as by temporarily turning off the path to the central. When the optical interrogation pulses fail to return to the central office, the central module knows that either the endpoint module is wishing to make a call, or a break exists in the communications path. The central module assumes that the endpoint module desires to make a call and responds by sending an acknowledgment. Thereafter, the endpoint module can proceed with communication.

37 Claims, 7 Drawing Sheets

OPTICAL COMMUNICATION SYSTEM WITH IMPROVED MAINTENANCE CAPABILITIES

RELATED APPLICATION

This is a continuation of application Ser. No. 08/439,059, filed May 8, 1995, now abandoned, which is a continuation in part of application Ser. No. 08/333,926 filed Nov. 3, 1994, now U.S. Pat. No. 5,559,624, which itself is a continuation of application Ser. No. 08/029,724, titled "Optical Network Based on Remote Interrogation of Terminal Equipment", filed Mar. 11, 1993 (henceforth, Darcie 8-1-3), now abandoned, which is assigned to the assignee of the instant application and is hereby incorporated by reference.

BACKGROUND OF THE INVENTION

1. Field of the invention

This invention related to optical communication networks.

2. Description of Prior Art

One approach for creating optical networks involves the use of a passive optical network (PON) in which there are no active components between a hub communication point, such as a central office, and an end communication point, such as a subscriber's terminal equipment. A feeder fiber from the central office provides a downstream optical signal to a remote distribution module, or node, (RN) that splits the optical signal for distribution onto a number of optical fibers, and each of the fibers terminates in an Optical Network Unit (ONU). The latter converts the received optical signal into electrical form and delivers it to either one or a number of subscribers.

The Darcie 8-1-3 application discloses a passive photonic loop arrangement where the central office employs wavelength division multiplexing (WDM) to form an optical signal for downstream transmission. That is, the information for each ONU is multiplexed onto an optical signal of the particular wavelength assigned to the ONU, thereby forming an information-bearing optical signal, and the information-bearing optical signals for the other ONUs (each having its own wavelength) are combined to form the WDM signal.

Illustratively, each of the different wavelength signals is generated from a different laser. The WDM optical signal is received by the RN, where it is demultiplexed into individual optical signals of particular wavelengths and each individual optical signal is then routed to its associated ONU, which may also be wavelength sensitive. The ONU employs a fraction of the received signal to detect the information that the central office was communicating, and employs the remainder of the received signal as a carrier for information that is transmitted by the ONU to the central office. Thus, the ONU does not need to have a light source of its own to serve as a carrier signals. Expressed another way, the central office creates a carrier signal which is used to communicate information downstream (when there is such information to be communicated) and which is also used to communicate information upstream (when there is such information to be communicated). Viewed another way, the central office effectively interrogates each ONU with the downstream optical signal, and allows each ONU to transmit its upstream information.

One feature of the system disclosed by Darcie 8-3-1 allows the use of a time-division multiplexing protocol that is decoupled from, or independent of, the ONU. As a result, the ONU does not have to have any predefined information about the time-division multiplexing protocol. This increases the flexibility of the central office to allocate system resources like bandwidth. Another feature of the system allows the use of subcarrier modulation of the transmitted optical signal to mitigate the effects of optical path delay (e.g., collision) on the upstream optical signal and to permit routing of signals at the ONU and the central office.

In addition, the disclosed system allows the central office to perform enhanced fault detection. In the embodiment described above, for example, there is effectively an unbroken optical circuit from the laser in the central office to an optical receiver in the central office, and this provides the central office with access to the entire optical loop.

In another copending application, Ser. No. 08/366,849, titled "A Passive Optical Network With Bi-Directional Optical Spectral Slicing and Loop-Back", filed Dec. 30, 1994 (Darcie 14-10-3), an arrangement is disclosed where information is transmitted from the ONU to the central office at a wavelength that is different from the wavelength at which information is sent by the central office, but the loop-back to the central office is maintained and it is used for evaluating continuity of the communication path to and from the ONU. This is accomplished by the central office sending a test signal at a wavelength that is different from the normal signal wavelength used to communicate to the ONU and different from the signal wavelength that is used to communicate from the ONU. The ONU loops it back, and the central office detects the returned signal as a confirmation of the path's continuity. Should the signal not return, conventional optical time domain reflectometry (OTDR) techniques may be employed to pin-point the break (or failure of the ONU). OTDR is described, for example, in J. M. Senior "Optical Fiber Communications" pp. 822–827 (Prentice Hall). This application is also incorporated by reference.

While use of a different wavelength for evaluating fiber continuity has certain advantages, there is also an advantage to not using a carrier of a different wavelength for that purpose because, in the latter case, no additional laser is required in the central office. However, it is not desirable to keep a central office carrier signal active all the time, because it consumes power.

SUMMARY

In accordance with the disclosure herein, the desire to confirm continuity of the bi-directional communication path between the central office and ONU is coupled with the process of establishing communication from the ONU and the central office. In the disclosed system, which follows the general mode of operation of the system disclosed in Darcie 8-1-3, when there is no active communication between the central office and the ONU, the central office repetitively sends an interrogation optical pulse to the ONU (at the ONU's assigned wavelength). Those pulses perform two functions: to determine whether the ONU wishes to initiate communication with the central office, and to report to the central office on the continuity of the communications path to and from the ONU.

In the ONU, a modulator whose function is to relay data from the customer's terminal is arranged to operate in two distinct modes. When it is "off", which is when the customer terminal is inactive, it allows central office signals to loop-back to the central office much like disclosed in the Darcie 8-1-3 application. In this state, the optical pulses sent by the central office serve the function of optical continuity checking. When an ONU wishes to establish a connection, i.e., the customer terminal wishes to "make a call", the modulator is arranged to interpose itself in the loop-back path and thereby inform the CO of its desire. One approach for informing the CO that a connection to some remote customer terminal is desired is to temporarily block the path to the central office by placing the modulator within the ONU in a state that prevents the return of the carrier to the CO. This can be done by applying an appropriate modulation signal to the modulator or, in the case of active modulators, by withholding the application of power to the modulator.

When the optical interrogation pulses fail to return to the central office, the central office knows that either the ONU is wishing to make a call, or a break exists in the communications path (the fiber broke, or the ONU failed). To distinguish between the two possible causes, the central office assumes that the ONU is signaling a desire to make a tall and responds by sending a carrier signal with information corresponding to a "dial tone" in conventional telephony circuits. When, in fact, the condition is that of the ONU wishing to make a call, the ONU receives the dial tone and responds by reopening the loop-back path to the central office. Consequently, a portion of the dial tone is returned to the central office, the central office detects the returned dial tone, and that serves as a confirmation that the central office's assumption was correct. When the failure of the optical pulse to return to the central office is caused by a system failure, the dial tone is also not returned to the central office and the latter failure serves as notice to the central office that a true failure exists.

Various other capabilities and features that relate to maintenance, system control, communication control, etc. are disclosed.

DETAILED DESCRIPTION

Figure 1:
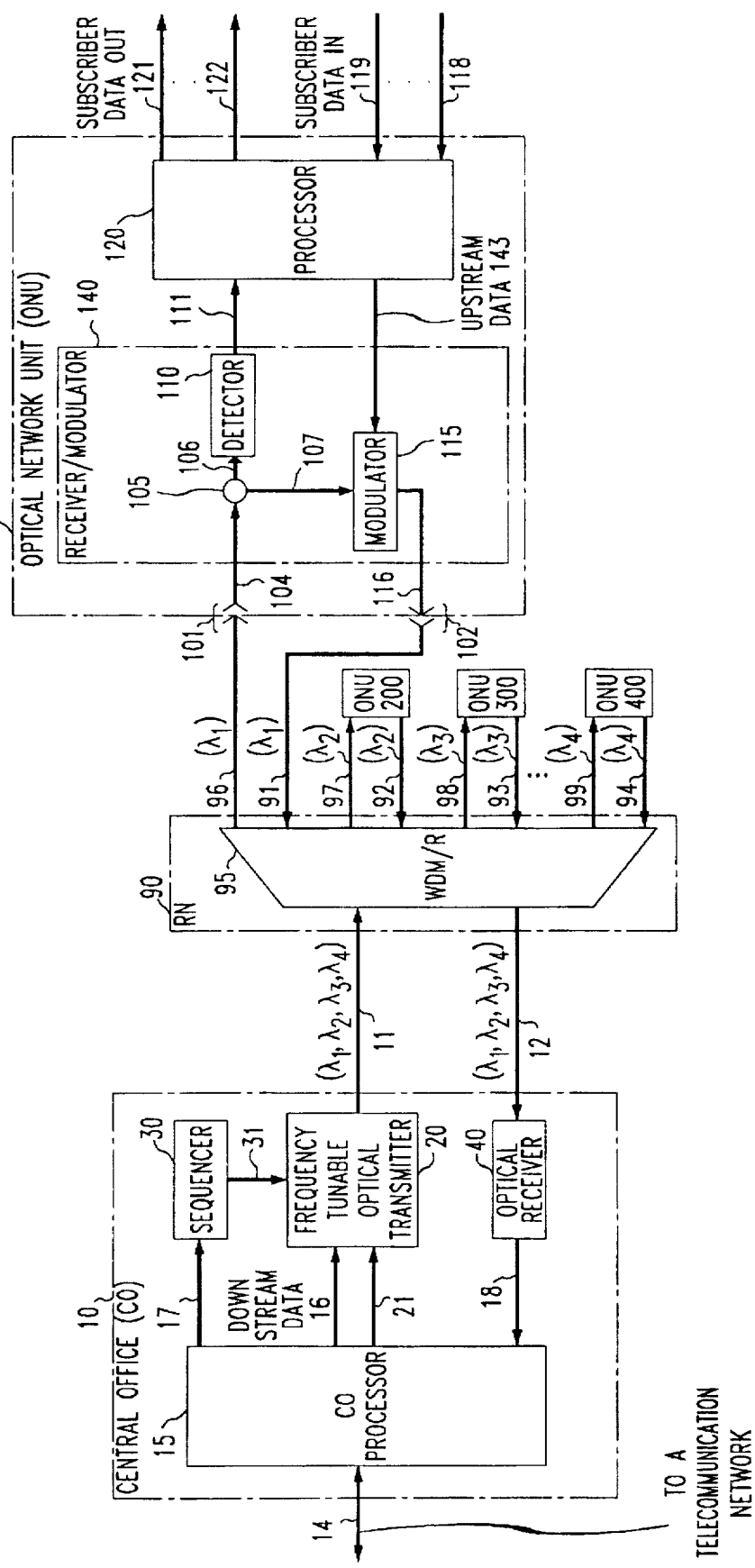
FIG. 1 is a block diagram of a passive optical communications system in accordance with the principles disclosed herein.

FIG. 1 presents a block diagram of an optical fiber communications system that comprises a local digital switch or hub, such as central office (CO) 10, remote node (RN) 90, and a number of optical network units, or ONUs, represented by ONU 100, ONU 200, ONU 300 and ONU 400. While it is not necessary, it is convenient to assume that all of the ONUs, or endpoints, are essentially identical in design, although each ONU may have different capabilities. Accordingly, only ONU 100 is shown in detail. CO 10 provides downstream optical signals over fibers to the RNs, such as optical fiber 11 connected to RN 90. Within RN 90, the downstream optical signal is split, i.e., demultiplexed, and the separate developed optical signals are provided to the various ONUs that are connected to the RN via optical fibers, such as ONU 100 which is connected to RN 90 via optical fiber 96. Each ONU can provide service to a number of subscribers, or customers, provided the signals destined to the different subscribers are carried by fiber 96 and can be separated out (e.g. by demultiplexing) at the ONU and delivered to the different subscribers. For the purposes of this description, only one subscriber is discussed, with data out line 121 to the subscriber and data in line 119 from the subscriber.

Turning now to the upstream direction, RN 90 receives an optical signal over an optical fiber from each ONU, e.g., on optical fiber 91 from ONU 100. RN 90 combines (i.e., mixes) the optical signals from each ONU and provides a single upstream optical signal to CO 10 over optical fiber 12. Except as described below, it is assumed CO 10 functions as in the prior art systems in providing services to each of the subscribers associated with each ONU. For example, CO 10 is able to provide a digital equivalent of plain old telephone service (POTS) between a called party, e.g., the subscriber associated with ONU 100, and a calling party, which might access CO 10 over facility 14 or from another ONU. Facility 14 is representative of any number of facilities that couples CO 10 to a telecommunications network (not shown); e.g., an inter-office trunk. Similarly, the data services can range from providing a simple data connection between terminal equipment of the subscriber associated with ONU 100 and a computer system (not shown), or the provisioning of video or multimedia services to a subscriber associated with ONU 100.

Figure 2:
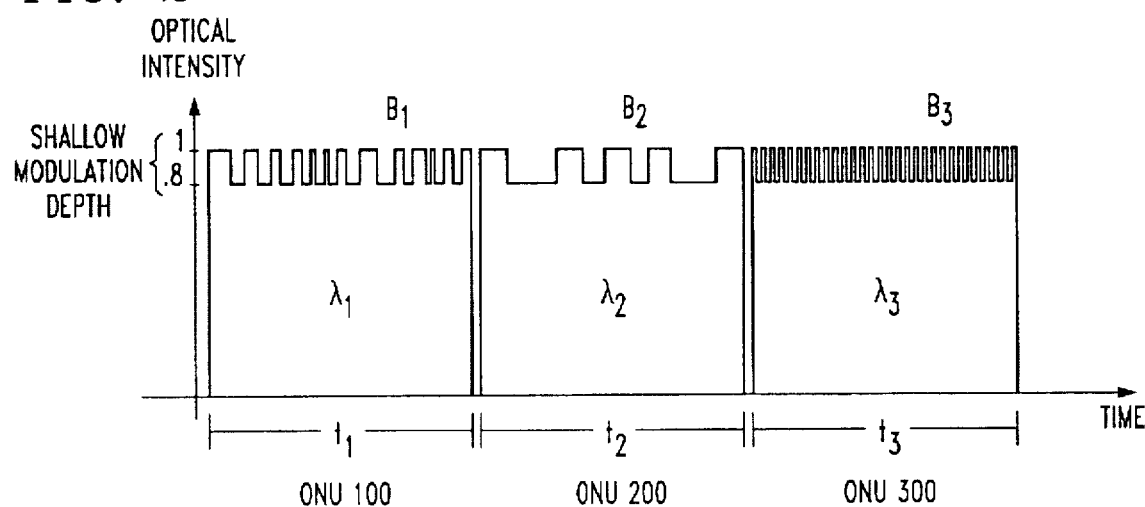
FIG. 2 shows time slots, the shallow modulation mode, gaps between time slots, and different data rates in different time slots.

As shown in FIG. 1, CO 10 comprises CO processor 15, frequency tunable optical transmitter 20, sequencer 30 and optical receiver 40. Transmitter 20 includes a light source (optical carrier) and a modulator with an electronic signal on line 16 modulating the optical carrier. The optical carrier is developed under control of signal line 31 in a tunable optical signal generator (e.g. tunable laser) or in plurality of lasers that are turned "on" by the signal(s) on line(s) 31. CO processor 15 provides the data that is destined to the ONUs that are coupled to RN 90. That is, the data delivered by line 16 is synchronized to sequencer 30 so that when sequencer 30 causes transmitter 20 to operate at the wavelength assigned to ONU 100, the data on line 16 corresponds to the data that needs to be delivered to ONU 100. Frequency tunable transmitter 20 can be constructed as taught, for example, in "Discretely Tuned N-Frequency Laser for Packet Switching Applications Based on WDM," B. Glance et al., Electron. Lett., vol. 27, pp. 1381–1383, 1991. For the transmitter 20 structure described above (e.g., tunable transmitter), sequencer 30 most naturally operates transmitter 20 in a time division multiplexing mode, as depicted in FIG. 2. There is a plurality of time slots, and each times slot contains optical signals of different wavelength: a first wavelength during a time slot $t_1$, a second wavelength during a time slot $t_2$, a third wavelength during a time slot $t_3$, etc. It may be observed that a strictly WDM system is also possible, where a plurality of lasers are each independently modulated and their outputs are combined. The operation of such a system closely parallels the TDM system described above and is conceptually simpler so, for sake of brevity, only the latter is described in detail. Skilled artisans can, of course, apply the teachings herein to a strictly WDM system.

Although the time slots shown in FIG. 2 are of equal duration, that is not a requirement. The data, or information, impressed onto the carrier during each time slot is destined, typically, to a different ONU and the modulation technique depicted in FIG. 2 is that of intensity modulation (i.e., ASK), with a low modulation index. In this, shallow modulation depth, a logic 1 is represented with a carrier at full intensity, and a logic 0 is represented with the carrier at intensity level 0.8. Of course, other modulation techniques are also possible. The freedom to have time slots of any length offers one degree of control for providing different bandwidths to different ONUs and customers. Another degree of control for adjusting bandwidth is the freedom to employ different data rates each of the different time slots. This control is illustrated in FIG. 2 by the different widths of the pulses appearing in the amplitudes of the carrier signals.

Although the above describes an RN 90 where signals of only one specific wavelength are directed to ONU 100, that is also not a requirement. A remote node can be employed where a number of wavelengths are directed to a particular ONU, as disclosed, for example, in the aforementioned Darcie 14-10-3 copending application. Of course, the ONU will generally include wavelength division demultiplexing means to separate out the different wavelength signals. One benefit of an arrangement where more than one wavelength is directed to a particular ONU is a greater flexibility that is available in distributing services to customer terminals which are connected to a particular ONU. Another benefit is a distinct maintenance channel, as disclosed in detail in the aforesaid copending application. Aside from being able to make a "go-no go" determination, various other maintenance operations can be carried out without disturbing normal communication with ONU 100, such as measuring power margin (i.e., determining how close the system is to becoming inoperative should the carrier signal power diminish). Measuring power margin can be done, for example, by dividing a time slot into segments and in each segment sending a carrier signal of progressively lower intensity (amplitude). When the sent signal returns to the CO (as described in the aforementioned Darcie 8-1-1 application, also described in detail below), the signal of segments with signal intensity lower than detectable by receiver 40 will, by definition, not be detected, and the last-detected segment would indicate to the CO the power margin that is present in the system. This measurement does not have to be done at a different wavelength, of course. As indicated below, it may be part of the standard maintenance tools that are employed even in systems that send a single wavelength signal to each ONU.

The transmitted optical signal from CO 10 is accepted by RN 90. In FIG. 1, the latter comprises wavelength division multiplexer/router (WDM/R) 95, such as, for example, described in "An N×N Optical Multiplexer Using a Planar Arrangement of Two Star Couplers," C. Dragone, IEEE Phot. Technol. Lett., vol. 3, pp. 812-815, 1991; and in "Integrated Optics N×N Multiplexer on Silicon," C. Dragone, C. A. Edwards, and R. C. Kistler, IEEE Phot. Technol. Lett., vol. 3, pp. 896-899, 1991. WDM/R 95 has linearity and reciprocity properties that allow all the light paths to be reversed. That is, light with wavelength λ applied to fiber 11 is routed to fiber 96, and light with the same wavelength applied to fiber 96 is routed to fiber 11. However, since in some applications it is advantageous to physically separate the upstream and downstream optical signals, WDM/R 95 differs from standard WDMs in that it can be configured to comprise a second set of ports for upstream transmission, as represented by optical fibers 91 through 94 and optical fiber 12. Of course, in the upstream path the signal must be combined, rather than be split up. This can be achieved with a simple power combiner, since the signal timing and wavelengths are dictated by the CO (although there would be splitting losses). Alternatively, the upstream combining can be wavelength selective (without splitting losses). An intrinsic feature of WDM/R 95 is that it accomplishes wavelength selective combining in a manner "slaved" to the concomitant wavelength separation performed on FIGS. 11 and 96-99.

Returning to the description of FIG. 1, ONU 100 accepts the light applied by optical fiber 96 with receiver/modulator 140. The latter comprises passive tap coupler 105, detector 110, and modulator 115. Passive tap coupler 105 splits the incoming light into two signals for application to optical paths 106 and 107. Only a small portion of the incoming light is needed by detector 110 and, therefore, the bulk of the incoming light (e.g., 80%) can be diverted to path 107. Optical path 106 applies its optical signal to optical detector 110, where the optical signal is detected, converted to an electrical signal, and sent on path 111. Path 111 provides this electrical signal to processor 120, which further conditions and processes the signal to provide a subscriber "data out" signal representative of the respective downstream information, via path 121. Optical path 107 applies its signal to optical modulator 115. This signal is the carrier signal that is modulated and sent back to CO 10. The carrier signal is modulated, e.g., ASK, with the data signal that the customer equipment (communicating through processor 120) wishes to sent to CO 10.

Figure 3:
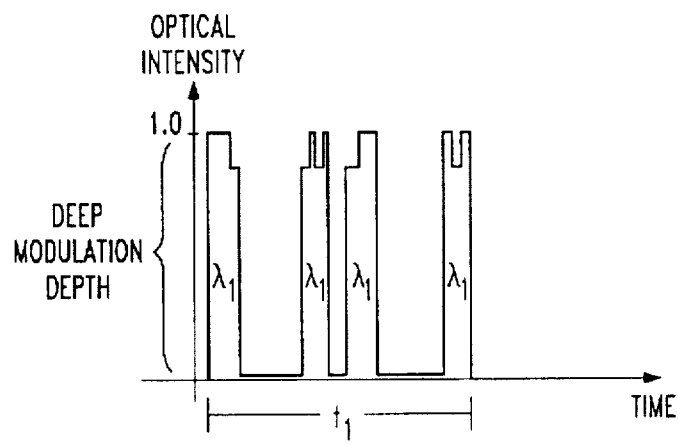
FIG. 3 shows the deep modulation mode that may be employed by ONU 100.

It may be noted that processor 120 releases its information to modulator 115 only during periods that processor 120 determines (in response to signals from detector 110) that the carrier signal is present. In applications where the optical carrier of modulator 115 comes directly from coupler 105, it must be taken into account that the carrier may contain an information component, which is the information that was sent by the central office to ONU 100. To differentiate between this information and the data applied by path 143, and keeping in mind that the AM modulation by CO 10 has a low modulation index, one approach for modulating in element 115 is to use a high modulation index, or a "deep modulation depth". This is illustrated in FIG. 3.

Figure 4:
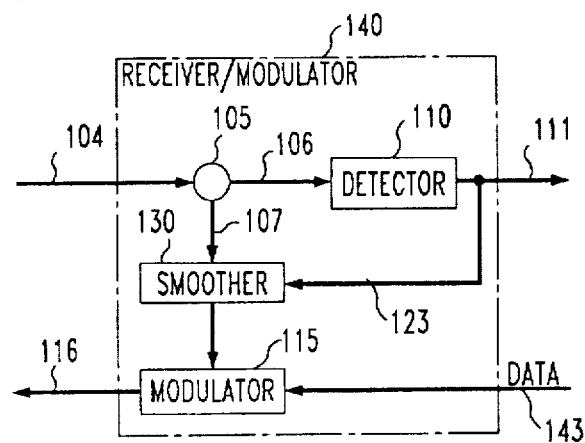
FIG. 4 presents one design of modulator 140.

Alternatively, the carrier signal applied to modulator 115 can be stripped of its data content (i.e., the data destined to detector 110). This can be done, for example, by including an optical amplifier in path 107 that goes into saturation. Stripping the data off the carrier can also be done with a feedback circuit that takes the output of detector 110 and remodulates the carrier appearing in path 107 to reverse the action of the CO's modulator. This is shown in FIG. 4, with element 130 interposed in path 107. As indicated above, "carrier smoother" 130 may be an amplifier or a modulator that is responsive to a feedback signal from detector 110. Carrier smoother 130 can also be incorporated in modulator 115. That is, the modulation signal on line 143 can be superimposed with data developed by detector 110.

The information-bearing optical signal developed by modulator 115 is applied to RN 90 via path 91. There, the signal is combined with signals from other ONUs and, together, they form the optical signal on path 12 which is sent to CO 10.

In may be noted in passing that the CO inherently knows from which ONU the data is arriving because it is carried on the very same signal that was sent by the central office to a specific ONU. Still it may be advantageous for processor 120 to include information in the data stream. That data can identify processor 120, or the source of the information relayed by processor 120, etc.

It may also be noted that the optical fibers from the different ONUs to RN 90 may differ in optical path length.

One possible consequence of different length fibers is that data in a time slot $t_i$ which immediately follows time slot $t_{i-1}$ out of the central office, is not necessarily in the same time relationship with data in time slot $t_{i-1}$ when it returns to the central office. There may an overlap with time slot $t_{i-1}$, or there may be a gap between the two time slots. The overlap can results in collisions at optical receiver 40 between the data of time slot $t_i$ and the data of time slot $t_{i-1}$. These collisions can be avoided in any number of ways.

One approach for avoiding these collisions is for CO processor 15 to take into account the various time delays before transmission of any downstream information; i.e., transmit time slots with appropriately timed gaps. Another approach is to sequence the data in downstream time slots arranged in increasing order of distance from the RN. Such an approach retains time order at the cost of introducing "dead time" in the downstream signal.

Figure 5:
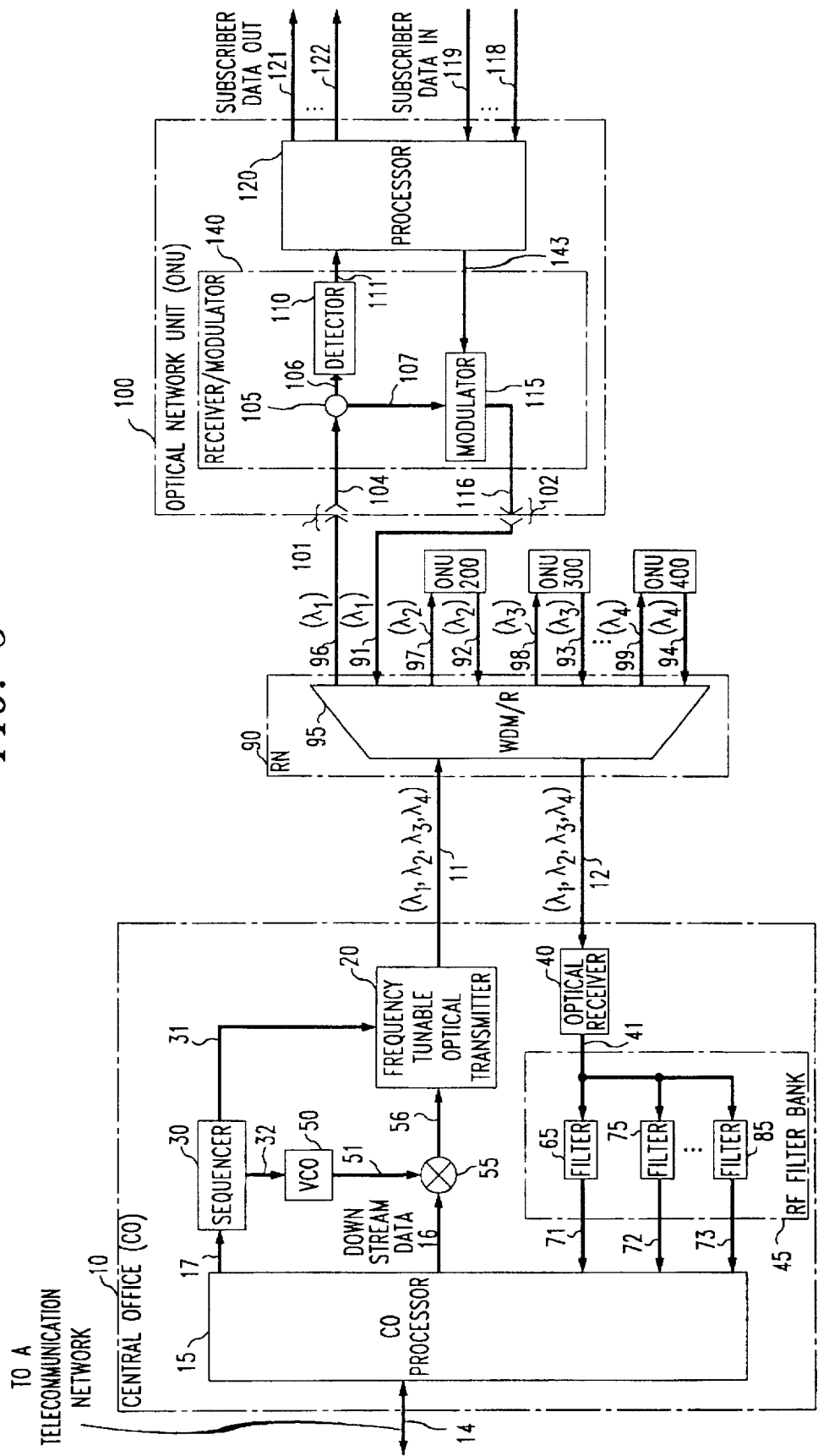
FIG. 5 depicts a system configuration employing subcarriers.

Another approach is to subcarrier modulate the packets in each time frame. This is shown in FIG. 5. The only differences between FIG. 1 and FIG. 5 are voltage controlled oscillator (VCO) 50, mixer 55, and RF filter bank 45 of CO 10. The downstream signal on path 16 is sub-carrier modulated by mixer 55 at one of a few frequencies. In other words, the downstream signal is shifted from a base-band frequency to a radio-frequency (RF) band. At the same time that sequencer 30 signals transmitter 20 to change the transmitter's wavelength, sequencer 30 also changes the frequency of VCO 50. Consequently, transmitter 20 modulates its light output with RF bursts at each particular frequency. The amplitude of each RF burst represents "ones" and "zeroes" in a manner similar to the "baseband" description of FIG. 1. The number of subcarrier frequencies need not be greater than the largest number of overlapping time slots.

Still another approach is to use a plurality of wavelength sensitive optical receivers (in other words, employ a WDM approach at the receiver) but subcarrier filters (e.g., 65, 75, and 85) are typically less expensive than tuned receivers.

From the above it should be understood that while it is essential that an ONU have "some" time slot in a time frame, the details about which time slot is being used is irrelevant to any particular ONU. In other words, since an ONU does not transmit anything back to the CO until it receives an optical signal from the CO, the ONU does not have to have any a priori knowledge about the time-division multiplexing assignments used by a central office. As a result, the time-division multiplexing format, both in terms of amount of time dedicated to an ONU and the sequence of transmissions by the central office to an ONU, can be varied in any fashion desired by the CO without requiring a change to the ONU equipment. This results in no synchronization requirements between CO 10 and an ONU, and allows CO 10 to provide "bandwidth on demand". If ONU 100 signals a need for extra bandwidth and ONU 200 is not busy, the length of time that the central office's laser transmits at the wavelength associated with ONU 100 can be doubled by using the time slot assigned to ONU 200. This kind of reassignment of slots does not require recomputation and reconfiguration of any network synchronization scheme and all of the ONUs are unaware that anything has happened.

The above describes the arrangement shown in FIG. 1 without detailed reference to actually how communication takes place between the central office and a subscriber terminal that is coupled to processor 120. The following describes one mode of operation.

Figure 6:
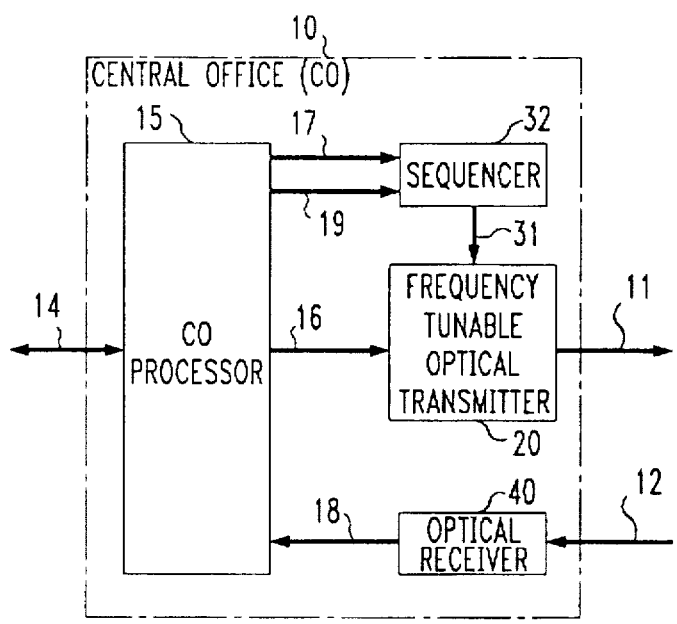
FIG. 6 illustrates interrogation pulse control within CO 10.

In accordance with the arrangement disclosed herein, CO 10 continually monitors the integrity of the paths to all the ONUs within its realm, such as ONU 100. It does so with a sequencer 32, shown in FIG. 6, which includes a control line 19 emanating from processor 15 in addition to control line 17. Whereas control line 17 directs sequencer 32 to control transmitter 20 to operate at a particular wavelength, as described previously in connection with FIG. 1, control line 19 merely gates the signal of sequencer 32. More specifically, control line 19 causes CO 10 to output a train of bursts, or interrogation pulses, of the carrier signal at the wavelength specified by control line 17. The interrogation pulses may be only a few percent of a time slot's duration perhaps even less than 1%), and this reduces the power consumption of the CO laser significantly. The interrogation pulses can be at any rate, but one simple approach is to position one interrogation pulse at the beginning of each time slot.

Alternatively, in arrangements where no time slots are employed (such as in a strictly WDM system), the interrogation pulses can go at any rate whatsoever. Modulator 115 optically depicted in FIG. 1 is a transmissive modulator, which can be passive or active. A passive modulator requires no power to pass a carrier signal from path 107 to path 116. An active modulator requires power, but it may also provide gain. Gain is desirable in many applications and, therefore, a simple active modulator may be appropriate. On the other hand, when the modulator is powered "off" (or the ONU itself loses power), it effectively cuts the optical signal path. In many applications it is desirable to continuously test the integrity of the signal path and this requires a path through the modulator (even when the ONU is not communicating upstream). However, the need to provide a source of continuous power is not welcome, and that holds particularly true when the integrity testing can be done with an interrogation pulse, as described above, which is active relatively seldom (e.g., very low duty cycle). Continuously powering the modulator in such an arrangement is truly wasteful of power.

Figure 7:
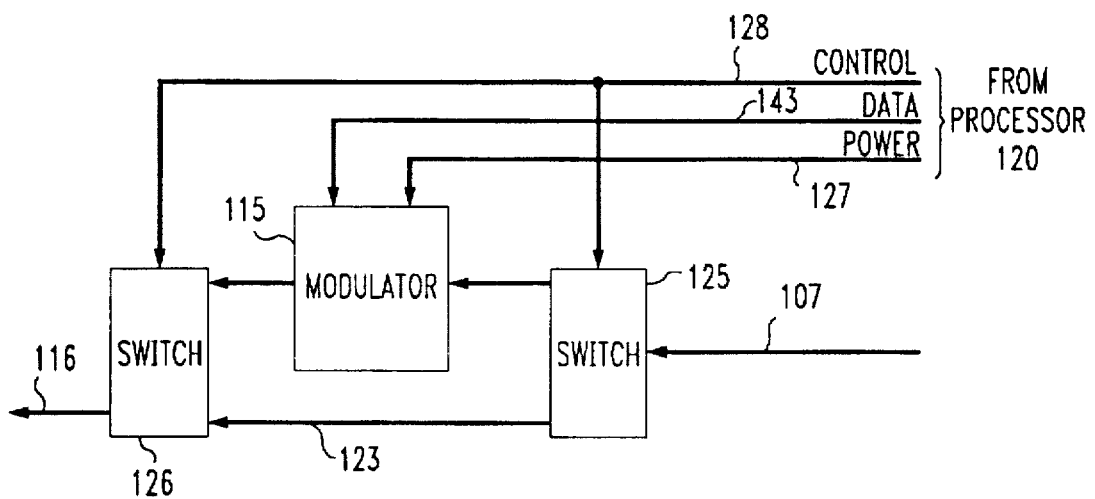
FIGS. 7-11 present another designs for modulator 140.

FIG. 7 presents one arrangement where an active modulator is employed which does not require the expenditure of power in order for the CO to test continuity of the path to ONU 100 and back. It comprises a bypass fiber 123 and "single pole, double throw" optical switches 125 and 126. The switches are under electrical control of line 128 (emanating from processor 120) and are arranged to pass the optical signals of path 107 to path 116 either through fiber 123 or through modulator 115. That control may be coupled to the application of power to modulator 115, but as will be disclosed below, there are distinct advantages to have that control be independent. The FIG. 7 modulator is an active, transmissive, modulator. Switches 125 and 126, by the way, can be as simple as electromechanical switches. Of course, they can also be more sophisticated, such as Lithium Niobate electro-optical switches.

Figure 8:
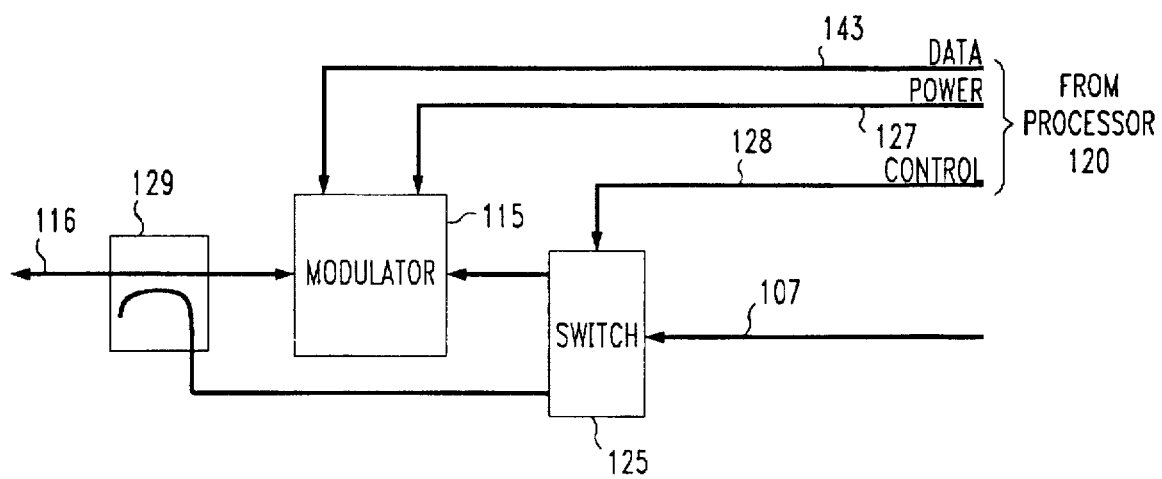
Figure 9:
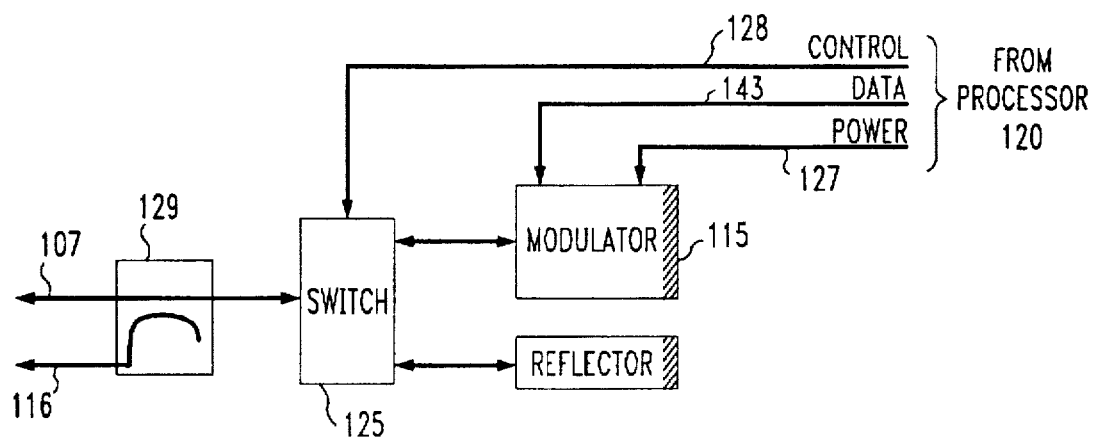

FIG. 8 presents another embodiment, where switch 126 is replaced by coupler 129, and FIG. 9 presents still another embodiment (using a reflective modulator) where a single switch, 125, is used. Many other variations are possible, of course, such as a two switch arrangement using a reflective modulator. The FIG. 9 arrangement is useful in systems that employ a "downstream" fiber and a separate "upstream" fiber (e.g., 107 and 116), as well as in systems where a single fiber is used for both "upstream" and "downstream" transmissions (e.g., only fiber 107).

Returning to FIG. 7, the arrangement accepts the optical bursts which arrive at the ONU and are passed onto fiber 107 and forwards those bursts to path 116. According to the teachings above, the CO detects the return of those optical bursts, and from that detection determines that the path to and from ONU 100 is operative. Taking advantage of the independent control over power line 127 and control line 128, processor 120 can employ the following operational schema.

When the customer terminal that is coupled to processor 120 is not in use, control line 128 includes fiber 123 in the signal path and power line 127 maintains modulator 115 in a "power off" state.

When the customer terminal detects incoming information (with detector 110) and concludes that it wishes to send information to the CO (e.g., the central office is applying a "ringing signal" and the customer terminal chooses to go "off hook"), then modulator 115 is included in the signal path (excluding fiber 123 from the signal path) and is powered "on".

When, in the absence of a signal from the CO (other than the repetitive optical bursts), the customer terminal wishes to send information to the CO (e.g. to dial out and make a call), then modulator 115 is included in the signal path (excluding fiber 123 from the signal path) but modulator 115 is kept in its "power off" state, or the modulator power is turned "on" but the modulation signal on line 143 is set to its minimum transmissiveness level (i.e., the modulation is effectively turned "off").

With such a schema in place, the CO can effectively employ the interrogation pulse notion disclosed above. When such pulses are sent to the ONU, CO 10 expects a return of the interrogation pulses, to confirm that the system is operational. When the interrogation pulses do not return, the CO knows that either the system failed or that the customer equipment placed the modulator of FIG. 7 in the signal path but withheld power to the modulator. According to the above protocol, the latter indicates that the customer's terminal has gone "off hook". The proper response by the CO to this condition is to provide a "dial tone" signal to the customer terminal. The dial tone can be generated at CO processor 15 and a digital signal that corresponds to a dial tone can be applied to line 16. Alternatively, CO processor 15 can send a code to processor 120, and processor 120 can generate the dial tone locally. Of course, processor 120 must turn modulator 115 power "on" for it to send the dialing signals to CO 10. Processor 15 responds to the dialing signals in a conventional manner. The called party specified by the dialing signals is coupled to processor 15 (perhaps via facility 14) and communication proceeds. What that means is that, instead of the short interrogating bursts, the CO provides an appropriate duration optical signal carrier during the time slots that communicate with the calling party at ONU 100. In the course of such "normal" communication, when signals are sent to the called party (the party not at ONU 100) the carrier from the CO to the ONU is modulated with signals from processor 15, and when the calling party (the customer at ONU 100) is transmitting a signal the optical carrier signal that flows back to the CO is modulated by 115.

The monitoring of the "health" of the communication path can continue even in the absence of interrogation pulses because there is sufficient energy in the returned signal to serve the needs of the circuit that does the monitoring. Stated in other words, the fact that communication is taking place is sufficient indication that the system is operational. The evaluations that are necessary for performing the monitoring function are carried out, of course, in receiver 40 and CO processor 15. Receiver 40 detects the optical signals, demultiplexes the subcarriers, demodulates the signals, and converts the resulting baseband signals to electrical form. Processor 15 takes the electrical digital signals developed by receiver 40 and analyzes them in a conventional manner (e.g. using filters, accumulators and threshold detectors) to determine whether a returned signal is present at the time it is expected to appear at fiber 12.

In the event that the CO provides a "dial tone" (or a code indicative thereof) but no dialing signals are detected in response, the CO concludes that there is a failure in the tested path and, then, OTDR or a similar process can be initiated. OTDR processes are well known, and are referenced in the above-identified Darcie 14-10-4 application.

It may be noted that the monitoring of the communication path even during an active connection between a customer terminal coupled to ONU 100 and some other customer terminal has a benefit other than just the knowledge gained by the maintenance system the system continues to be operational. For example, this monitoring can be used to detect "end of conversation" condition, or to detect a "hook flash" condition. The manner of such detection is effectively as before. On the ONU side, when the customer terminal executes a "hook flash" or terminates the communication, processor 120 turns power off to modulator 115 (for a short predetermined time, in the case of a "hook flash", or permanently, for an "end of conversation" condition) but keeps modulator 115 in the path of fibers 107–116. When CO processor determines that the continuous carrier signal has not returned for an interval greater than a preselected threshold (because modulator 115 was turned "off"), it first makes the tentative conclusion that it sees a "hook flash". When the carrier signal resumes its return to the CO (when it indeed is a "hook flash" condition), the CO confirms the conclusion that it experienced a "hook flash", and responds accordingly in a conventional manner. When the carrier signal continues to not return, the conclusion is made that either the customer terminal went "on hook", or the communication path failed. Assuming the former, the CO sends a message to processor 120 in ONU 100, directing it to confirm the "on hook" condition. Processor 120 does so by switching modulator 115 out of the signal path and inserting fiber 123 in the path (via control of switches 125 and 126). Placing fiber 123 in the path allows the optical carrier to return to the CO, which serves as the sought confirmation, and in response thereto, the CO returns to the pulsed monitoring mode; i.e., returns to sending the interrogation pulses.

While the above-described process of call establishment, communication, and call termination are couched in terms of a desire on the part of the customer terminal and readers might envision a human user activating the customer terminal, e.g. a telephone, it should be understood that the processes described above can be arranged to occur upon the occurrence of any other event, such as a fire or burglary at the home of the customer, etc. Still other ways are available for achieving these sought results, and it should be understood that the above is merely illustrative of the principles disclosed herein.

Figure 10:
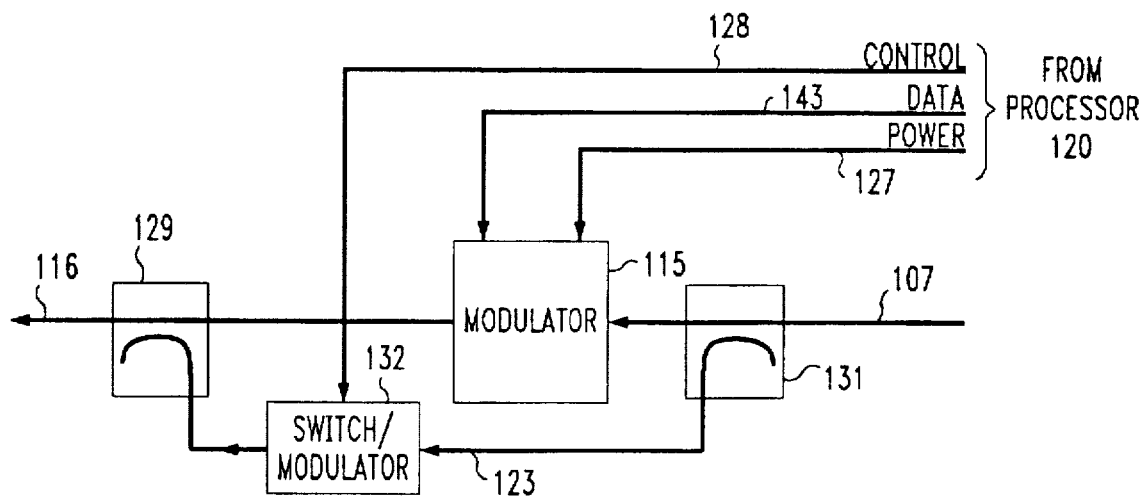

FIG. 10 presents still another embodiment of receiver modulator 140, where a transmissive modulator 115 is flanked by coupler 131 and 129, and a switch/modulator 132 is interposed in fiber 123. Element 132 can be a fiber, a simple "single pole single throw" mechanical switch, another modulator, or a modulator combined with a switch (e.g., serially). There is a particular advantage to using a passive modulator for element 132 in that it provides a second, distinct, channel of communication to the CO. That is, because it is passive, no expenditure of power occurs on its behalf at ONU 100. Moreover, the signal returned to the CO is markedly different in magnitude from the signal returned from modulator 115, and it could be even more different if the modulation technique used is different from that of modulator 115. For example, the signal modulating the carrier at element 132 can be an analog signal, while the signal modulating the carrier at element 115 can be a digital signal, or vice-versa. Also, instead of coupler 131 and 129, either one or both can be switches, in which case element 132 may be a mere modulator.

To a skilled artisan the possible variations are almost endless.

As for use of this enhanced capability, passive modulator 132 can be used to monitor a home for emergency conditions, can be used to read-out information from the home, such as reading power meters, etc. Even mechanical modulation of the light is possible.

In operation, when element 132 does not wish to communicate and the customer terminal is "on hook", modulator 132 is made to pass carrier signal (i.e. is made fully transmissive) and modulator 115 is turned "off". The CO bursts pass through element 132, and the operation is as described before. When an emergency condition occurs and element 132 wishes to communicate information, it turns least transmissive and the CO (in response thereto, as described before) sends a dial tone. Under control of processor 120, element 132 sends a particular data sequence and the CO responds accordingly. From the magnitude of the signals the CO knows that it is modulator 132 that is communicating. The CO can, therefore, provide appropriate compensation (e.g. gain or filtering) and simply make the appropriate connection. In the alternative, it can accept the data sequence as an instruction to the CO to take some predetermined action.

In the forward direction, when the CO wishes to access information from the customer via element 132 rather than make a full fledged connection to the customer's terminal, it sends an alert signal to processor 120 (via detector 110) that is different from the normal alert signal. Processor 120 responds appropriately by sending the sought information over the element 132 channel, and the desired result is achieved. It may be noted that the same can be accomplished by using modulator 115.

In applications where element 132 is a switch, the operation is identical to that of FIG. 7. In applications where element 132 does not exist, which is the case when it is said to consist of merely a fiber, the operation must rely on a somewhat finer control of modulator 115. That is, the above-described operation depends on having three states: a state where the bursts are returned (fiber 123 is in the path), a state where bursts are not returned (fiber 123 is not in the path and modulator 115 is "off"), and a state where a carrier signal is modulated at enhanced amplitude (modulator 115 is "on"). In an arrangement where fiber 123 connects couplers 129 and 131 directly, the three states would be a state where bursts are returned, a state where the bursts are returned amplified somewhat (modulator 115 is turned on, and control 128 is set to a preselected amplification level), and a state where the carrier is modulated. Of course, on the CO side there would be a fourth state, where no bursts are returned at all. CO processor 15 can easily accommodate the enhanced capabilities that the fourth state presents. It should me noted that the arrangement where there is only a fiber between couplers 129 and 131 is likely to create interferometric noise, fading, etc.

Yet another arrangement can simply follow the FIG. 1 structure where only control over the output of modulator 115 is employed, provided that modulator 115 is passive. For example, when the customer terminal is "on hook", modulator 115 can be set to a state where is passes signals unaltered (i.e., maximum transmissive state). That allows the interrogation pulses to return to the CO. When the customer's terminal goes "off hook", the modulator is set at its least transmissive state, and the CO is faced with the question of whether the terminal is "off hook" or the signal path failed. That question is resolved as discussed above. When communication actually takes place, the modulator modulates the carrier as described above. Alternatively, the "off hook" condition can be specified by some other state of the modulator, such as placing the modulator in a medium transmissive state, alternating the modulator between minimum and maximum transmissive states at some preselected rate (slower than the repetition rate of the interrogation pulses), etc. The latter approach can also be used with active modulators.

Figure 11:
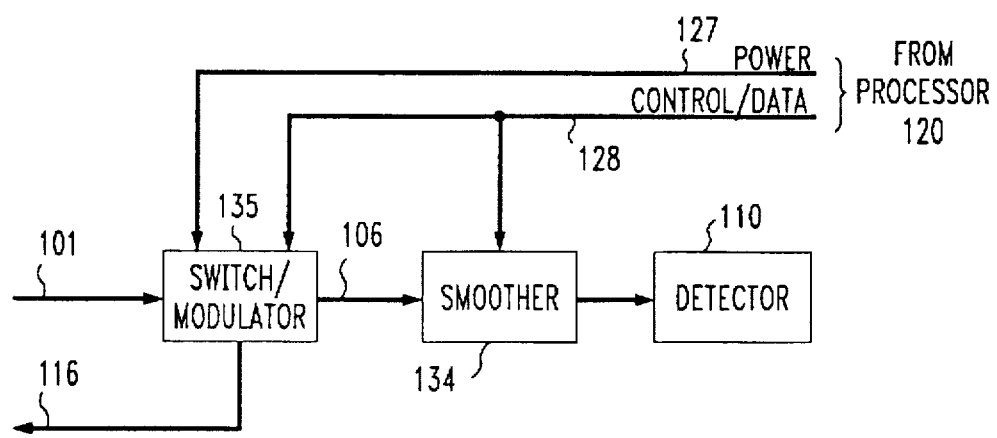
Figure 12A:
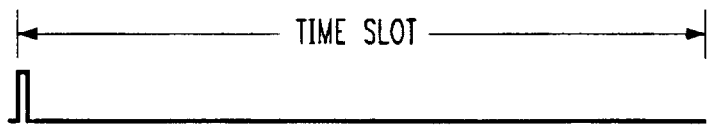
FIGS. 12A-12G illustrate various time slot formats.
Figure 12B:
Figure 12C:
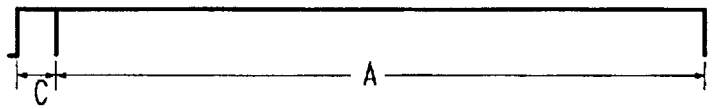
Figure 12D:
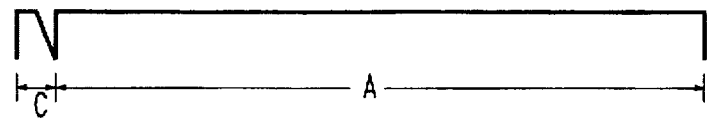
Figure 12E:
Figure 12F:
Figure 12G:
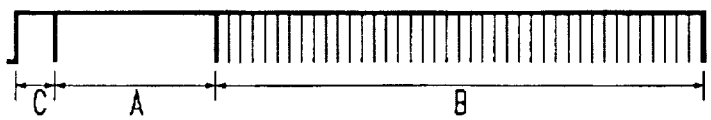

FIG. 11 presents an embodiment where the splitting of the signal that occurs in element 105 of FIG. 1 and the modulation that occurs in element 115 are combined. Specifically, element 135 is a splitter with a built-in optical amplifier. Based on the value of the signal on line 128, a portion of the optical signal (amplified) that is applied by fiber 101 is directed to path 116, and the remainder is directed to path 106. Alternatively, element 135 can comprise a coupler of the type described above followed by an amplifier in the output leg that goes to fiber 116.

When the communication between the customer terminal and some other terminal is such that simultaneous transmission in both directions is not essential then, of course, there is no need for smoother 134. When data is being sent to detector 110, control signal 128 is at a dc level that corresponds to the sending of no energy to path 116 and the sending of all optical energy to detector 110. When data is being sent to the CO, control signal 128 modulates amount of energy that is sent to path 116, and the CO receives the sent data. Of course, the complement of the signal sent to the CO also arrives at detector 110 (less the amplification that may be present in the path to the CO), but detector 110 can be disabled or made to ignore its reception.

When the communication between the customer terminal and some other terminal needs to be fully duplex (i.e., permitting of communication in both directions simultaneously), a smoother 134 is interposed between element 135 and detector 110 which is under control of data line 128. Smoother 134, which may be passive or active, removes the effects of modulator 135, so that detector 110 sees only the data sent to it by CO 10.

Having mentioned the notions of "full duplex" communication, it should be pointed out that the above uses the term in the sense of having a carrier which, effectively, carries communication in both directions simultaneously. It does not refer to the notion of communication always flowing in both directions (such as in a conventional, analog, "plain old" telephone service). But that notion has to be taken in light of the general structure of the FIG. 1 system, where communication between CO 10 and ONU 100 is contemplated to occur only whenever the CO outputs a carrier of the right wavelength, and the latter occurs as dictated by sequencer 32 (or 30). Data signals typically have no problem with being sent in bursts, during the appropriate time slot. Speech signals, likewise, have no problem if some appropriate delay is acceptable. Given that fact, the distinction between half duplex and full duplex is effectively obliterated when the time slot during which sequencer 32 causes to CO 10 to communicate with ONU 100 is divided into a "send" segment and a "receive" segment. If the send and receive segments are long enough and the bandwidth during those segments is high enough to provide the necessary overall bandwidth, then on a macroscopic level a full duplex operation is attained even though on a microscopic level the operation is half duplex.

With that in mind, FIG. 12 depicts various possible signal conditions during a time slot when communication occurs with a particular ONU, such as ONU 100. FIG. 12A depicts an interrogation pulse. FIG. 12B depicts an interrogation pulse that is wide enough to include a reducing amplitude segment (or a sequence or trailing pulses with a predetermined set of generally declining amplitudes) that is used to measure power margins, as described above. FIG. 12C shows a time slot that includes segments C and A. Segment C is a control segment, and segment A is a data segment. The communication segment provides a communication channel that can be employed throughout a communication session. The control segment provides a control channel from the CO to the ONU, which can be used throughout a communication session between a customer terminal coupled to an ONU and some other customer terminal, or even in the absence of such a communication session. FIG. 12D shows a control segment that includes a power margin test. FIG. 12E shows a control segment C and communication segments A and B. During segment A, CO 10 sends information to the ONU, and during segment B the ONU sends information to the CO. FIG. 12F depicts segments C, A, and B, and further shows segment C being divided into sub-segments C1 and C2. Sub-segment C1 is a control segment where CO 10 sends control information to the ONU, and sub-segment C2 is a control segment where the ONU sends control signals to the CO. FIG. 12F also depicts a condition where sub-segment C1 and segment A are much smaller than their siblings, sub-segment C2 and segment B, respectively. This condition may be employed when the customer's terminal is one where there is a natural disparity between the incoming and outgoing data rates, or a condition where the actual modulated data rates are different. The latter arrangement may be used when, for example, it is less expensive to employ an ONU which can receive high data rates but can only transmit lower data rates than it is to employ an ONU which can receive and transmit at the same data rates. FIG. 12G depicts a time slot with control segments C, A and B, and further shows that segment B is modulated at some preselected, relatively high frequency, subcarrier. This subcarrier is effectively a clock signal. This clock signal can be used by the CO, when it returns with the data from the ONU (e.g. to assist in the detection of the data), can be used by the ONU, or both.

It may be noted that a system arrangement such as disclosed in connection with FIG. 1 is not limited to any one specific time slot format, such as the ones shown in FIG. 12. Rather, the formats can be dynamically modified as the need arises. For example, the FIG. 12C format may be to send a "ringing packet" to the ONU, while FIG. 12G format is used during a communication session.

One of the major advantages of the system disclosed above is the fact that the ONUs are basically subservient to the CO; i.e., effectively all control is exercised by the CO. One variable that has not been addressed above is variations in the RN due to design tolerances and, more significantly, variations due to temperature changes. RN routers are typically placed outside the central office buildings and, having managed to create an RN that is totally passive, it makes sense to allow the placement of the RNs in the "outside plant". However, even though a passive RN (e.g. comprising glass gratings) is a rugged device, it is typically temperature sensitive in its wavelength selectivity. One approach for solving the potential mismatch between the wavelengths that are deployed by the CO and the wavelengths to which the RN is sensitive is to monitor the RNs' responses at the CO and to modify the wavelengths of the lasers accordingly. This additional control is shown by control line 21 in FIG. 1 which CO processor 15 applies to element 20. Internally within CO processor 15, a software feedback loop is executed where the wavelength at which a laser is operating while communicating with a particular ONU is periodically modified. The output of receiver 40 is compared to the output of receiver 40 prior to the wavelength's modification. When the output of receiver 40 increases, the conclusion is made that the modification was beneficial, and the succeeding modification is made in the same direction (i.e., reducing or increasing the wavelength, whichever was done before). When the output of receiver 40 reduces, the conclusion is made that the modification was detrimental, and the next modification is made in the opposite direction. By this process, the cooperation between receiver 40, CO processor 15 and element 20 under control of signal 21 causes the output of element 20 to properly follow the needs of the considered RN and, correspondingly, of all other RNs in the system.

We claim:

1. In a system including a hub module, at least one endpoint module, and a communication channel connecting the hub module to the at least one endpoint module, a method comprising the steps of:

the hub module applying a signal to the communication channel having a signal characteristic that allows for reception of the signal by the at least one endpoint module but not by other endpoint modules, where the signal, under control of the hub module, either has an interrogation format or a communication format;

the interrogation format performing a signaling function for apprising the hub module of the status of the at least one endpoint module; and the at least one endpoint module sending a return message signal to the hub module, where the return message signal comprises a portion of the signal sent by the hub module, modulated with data from the at least one endpoint module, when conditions at the at least one endpoint module call for such modulating.

2. The method of claim 1 where the signal flowing in the communication channel is an optical signal.

3. The method of claim 2 where the signal characteristic is the wavelength of the optical signal.

4. In a system including a hub module, one endpoint module and one or more other endpoint modules, and a communication channel connecting the hub module to the one endpoint module, a method comprising the steps of:

the hub module applying a signal to the communication channel that has a signal characteristic that allows the signal to be received by the one endpoint module and not by the one or more other endpoint modules, where the signal, under control of the hub module, has an interrogation format or a communication format;

the interrogation format performs a signaling function and contains no data from the hub module to the one endpoint module; and the one endpoint module sending a return message signal to the hub module, where the return message signal comprises at least a portion of the signal sent by the hub module, modulated with data from the one endpoint module, when conditions at the one endpoint module call for such modulating.

5. In a system including a hub module, at least one endpoint module, and a communication channel connecting the hub module to the at least one endpoint module, a method comprising the steps of:

the hub module applying a signal to the communication channel that has a signal characteristic allowing the signal to be received by the at least one endpoint module and not by other endpoint modules connected to the hub module, where the signal at times has an interrogation format and at times a communication format, and the interrogation format carries only that information which is necessary to provide status information to the hub module; and the at least one endpoint module sending a return message signal to the hub module, where the return message signal is a portion of the signal sent by the hub module, modulated with data from the at least one endpoint module, when conditions at the at least one endpoint module call for such modulating.

6. The method of claim 5 where the communication format permits information to be communicated from the hub module to the at least one endpoint module, and vice versa.

7. The method of claim 5 where the hub module receives the return message signal.

8. The method of claim 7 where the at least one endpoint module is coupled to a customer terminal and where the hub module sends a signal having the interrogation format when the hub module believes that the customer terminal is inactive, and the hub module sends a signal having the communication format when the hub module believes that the customer terminal is active.

9. The method of claim 8 where the at least one endpoint module includes a modulator for modulating, when called upon, a portion of the signal received from the hub module and for forming said return message, and further comprises the step of permitting passage of said portion of the signal received from the hub module, unmodulated, to the hub module when the customer terminal is inactive and wishing to remain inactive.

10. The method of claim 9 where the step of permitting passage comprises bypassing the modulator.

11. The method of claim 10 further comprising the step of holding the modulator in an inactive state when the customer terminal is inactive.

12. The method of claim 11 wherein the step of holding the modulator inactive comprises withholding operating power from the modulator.

13. The method of claim 11 further comprising the step of:

in response to an alert signal received at the at least one endpoint module, the at least one endpoint module activating the modulator.

14. The method of claim 9 where the step of permitting passage places the modulator in a state that permits passage of signal through the modulator when the customer terminal is inactive and wishes to remain inactive.

15. The method of claim 9 further comprising the step of the at least one endpoint module blocking the sending of signals to the hub module when the customer terminal wishes to become active.

16. The method of claim 15 further comprising the step of:

in response to an enablement signal received at the at least one endpoint module following the step of the at least one endpoint module blocking the sending of signals, the at least one endpoint module activating the modulator.

17. The method of claim 15 further comprising the step of:

in response to an enablement signal received at the at least one endpoint module following the step of the at least one endpoint module blocking the sending of signals, the at least one endpoint module applying operating power to the modulator.

18. The method of claim 15 further comprising the step of:

in response to an enablement signal received at the at least one endpoint module following the step of the at least one endpoint module blocking the sending of signals, the at least one endpoint module allows passage of signals through the modulator.

19. The method of claim 16 where the enablement signal is a "dial tone" signal.

20. The method of claim 9 further comprising the step of the at least one endpoint module alternating between periods of blocking the sending of signals to the hub module and allowing the sending of signals to the hub module.

21. The method of claim 9 further comprising the step of the at least one endpoint module partially blocking the sending of signals to the hub module.

22. The method of claim 8 where the hub module further carries out the step of:

determining a condition in the return message signal received at the hub module which indicates that the customer terminal coupled to the at least one endpoint module is changing from an inactive state to an active state.

23. The method of claim 22 where the hub module further carries out the step of sending a response signal to the at least one endpoint module upon determining that the at least one endpoint module is changing from an inactive state to an active state.

24. The method of claim 22 where, in sending of the response signal, the hub changes the format of the signal sent from the interrogation format to the communication format.

25. The method of claim 22 where the step of sending the return message signal comprises the steps of:

changing the format of the signal sent by the hub module from the interrogation format to the communication format; and impressing information on the communication formatted signal sent by the hub module, acknowledging that the customer terminal is changing to an active state.

26. The method of claim 25 where the hub module further comprises the steps of:

receiving a second return message signal, in response to the sending of the response signal to the at least one endpoint module;

taking control action of a first variety when the step of receiving detects the presence of predefined information on the second return message signal; and taking control action of a second variety when the step of receiving fails to detect the presence of the predefined information on the second return message.

27. The method of claim 26 where the control action of the second variety is a process for locating a fault in the communication channel.

28. The method of claim 7 in a system that also includes a distribution module interposed between the hub module and the at least one endpoint module, the method further comprising the step of:

the hub module adjusting parameters of the signal applied by the hub module to the communications channel to insure that the signal is particularly suited for the distribution module to forward the signal to the at least one endpoint module.

29. The method of claim 7 further comprising the step of the hub module executing an evaluation of operational attributes of the system.

30. The method of claim 7 further comprising the step of the hub module executing an evaluation of operational attributes of the system based on intensity of the signal applied to the communication channel and detection of the return message signal in response thereto.

31. The method of claim 7 where the communication formatted signal comprises control segments and information segments, and the hub module further performs the step of imparting control information to the control segment.

32. The method of claim 7 where the communication formatted signal comprises a time slot that includes a control segment and an information segment, and the hub module further performs the step of imparting data information to the information segment.

33. The method of claim 7 where the communication formatted signal comprises a time slot that includes a downstream information segment and an upstream information segment, and the hub module further performs the step of imparting data information to the downstream information segment.

34. The method of claim 32 further comprising the step of the hub module modulating the communication formatted signal with a clock signal.

35. The method of claim 7 where the signal applied by the hub comprises a carrier signal having a wavelength, and the signal is particularly suited for reception by the at least one endpoint module by virtue of the specific wavelength of the carrier signal.

36. The method of claim 7 where the hub module develops the signal applied by the hub with distinct time slots and with adjacent time slots adapted to carry a carrier signal of different wavelengths.

37. The method of claim 36 where each time slot is devoted to communications with a particular endpoint module, and the signal developed by the hub module in a time slot is particularly suited for reception by the particular endpoint module by virtue of the specific wavelength of the carrier signal.

* * * * *